United States Patent [19]
Booth et al.

[11] Patent Number: 6,111,618
[45] Date of Patent: Aug. 29, 2000

[54] LCD PROJECTOR ILLUMINATION SYSTEM HAVING BLUE AND RED DICHROIC MIRRORS POSITIONED SUCH THAT BLUE MIRROR RECEIVES LIGHT BEFORE RED MIRROR

[75] Inventors: David K. Booth, Tigard; Arlie R. Conner, Tualatin, both of Oreg.

[73] Assignee: Lightware, Inc., Beaverton, Oreg.

[21] Appl. No.: 09/028,158

[22] Filed: Feb. 23, 1998

[51] Int. Cl.[7] .......................... G02F 1/1335; G03B 21/00; G03B 21/26
[52] U.S. Cl. .................... 349/5; 349/8; 349/95; 353/31; 353/34
[58] Field of Search ................. 349/5, 8, 95; 359/40, 359/41, 49; 353/31, 34

[56] References Cited

U.S. PATENT DOCUMENTS

| | | | |
|---|---|---|---|
| 4,686,519 | 8/1987 | Yoshida et al. | 340/701 |
| 5,161,042 | 11/1992 | Hamada | 359/41 |
| 5,455,694 | 10/1995 | Ariki et al. | 359/40 |
| 5,491,525 | 2/1996 | Yamasaki et al. | 349/5 |
| 5,526,237 | 6/1996 | Davenport et al. | 362/32 |
| 5,587,626 | 12/1996 | Parham et al. | 313/634 |
| 5,608,551 | 3/1997 | Biles et al. | 359/95 |
| 5,623,348 | 4/1997 | Ogino | 349/5 |
| 5,623,349 | 4/1997 | Clarke | 349/8 |
| 5,633,737 | 5/1997 | Tanaka et al. | 349/95 |
| 5,760,850 | 6/1998 | Nakanishi et al. | 349/5 |
| 5,764,319 | 6/1998 | Nishihara | 349/5 |
| 5,852,479 | 12/1998 | Ueda et al. | 349/9 |

FOREIGN PATENT DOCUMENTS

| | | | |
|---|---|---|---|
| 0389240 | 9/1990 | European Pat. Off. | G02B 27/10 |

*Primary Examiner*—James A. Dudek
*Assistant Examiner*—Tarifur R. Chowdhury
*Attorney, Agent, or Firm*—ipsolon llp

[57] ABSTRACT

A color liquid crystal display projector having a light source with a radiating element and a liquid crystal display (LCD). The LCD includes an array of multiple picture elements or pixels that each has separate color component elements. A microlens array is positioned adjacent to the liquid crystal display to direct light from the light source into the picture elements. Illumination imaging components cooperate with the microlens array to image the radiating element toward the separate color component elements of the liquid crystal display. Multiple differently inclined dichroic mirrors split the light into light beams of different color components that are imaged onto the appropriate color component elements of the liquid crystal display.

21 Claims, 5 Drawing Sheets

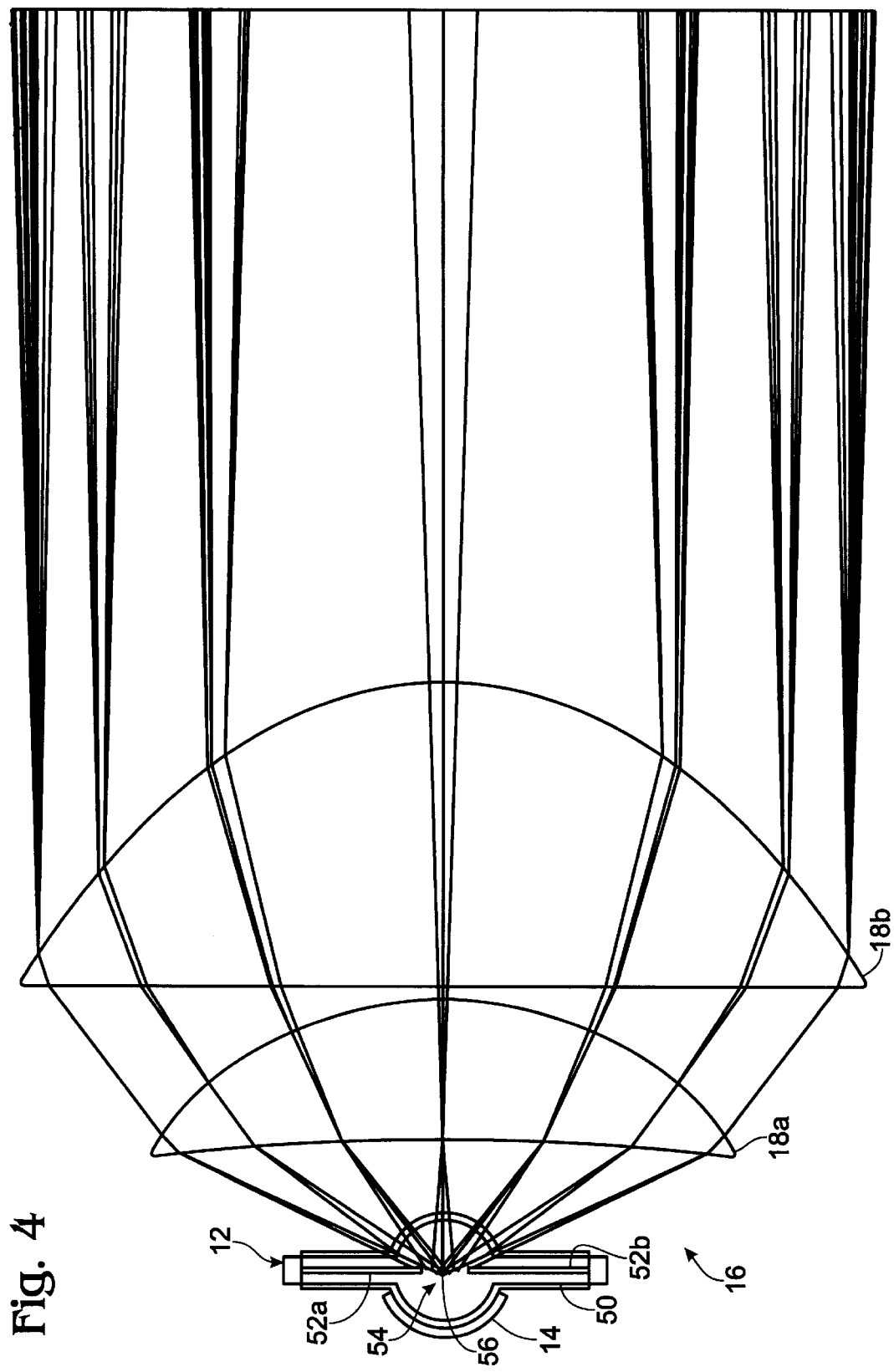

LCD PROJECTOR ILLUMINATION SYSTEM HAVING BLUE AND RED DICHROIC MIRRORS POSITIONED SUCH THAT BLUE MIRROR RECEIVES LIGHT BEFORE RED MIRROR

FIELD OF THE INVENTION

The present invention relates to color LCD projectors and, in particular, to such a projector that provides high brightness, high efficiency illumination.

BACKGROUND AND SUMMARY OF THE INVENTION

Color liquid crystal display projectors generate display images and project them onto display screens, typically for viewing by multiple persons or viewers. The display images may be formed by transmitting light from a high-intensity source of polychromatic or white light through an image-forming medium such as a liquid crystal display (LCD).

Conventional liquid crystal display systems include a mosaic of color selective filters positioned over the liquid crystal display element to separate the white light into its constituent color components (e.g., red, green, and blue) to render a full color display. The mosaic of color filters is arranged to provide particular color light components to particular sub-element apertures of the picture elements or pixels in the display.

A disadvantage of such conventional liquid crystal display projection systems is that the mosaic of color selective filters blocks significant amounts of light. In projection display applications, light brightness is an important performance feature. To improve upon the light brightness capabilities of conventional liquid crystal display projection systems, various modifications have been developed.

U.S. Pat. No. 5,161,042 of Hamada describes a color liquid crystal display projection system that utilizes a sequence of red, green, and blue inclined dichroic color selective mirrors to efficiently form separate color component light beams. The separate color component light beams are directed to a microlens array that converges the light beams onto the picture element apertures of the liquid crystal display. While providing improved efficiency in the color separation of light over conventional color filter mosaics, the Hamada patent appears to employ conventional illumination components, which suffer from several systemic deficiencies.

Within the apparent context of conventional color filter mosaic liquid crystal display systems, U.S. Pat. No. 5,455,694 of Ariki et al. describes an illumination optical system that includes a microlens array positioned near the liquid crystal display elements to provide them with a high aperture ratio. The illumination optical system is constructed so that the light source is effectively conducted to the picture elements or pixels and is "almost not eclipsed" by optically opaque components of the pixels. Despite such an improvement, the Ariki et al. patent also utilizes conventional optical illumination compounds or arrangements that hamper the overall illumination for efficiency.

Illumination brightness in color of LCD projection display is an important performance feature. As illustrated by the Hamada and Ariki et al. patents, typical attempts at improving illumination brightness focus on localized optical components. An aspect of the present intention is that illumination brightness in a color LCD projection system is addressed at a systemic level.

Accordingly, the present intention includes a color liquid crystal display projector having a light source with a radiating element (e.g., arc or incandescent) and a liquid crystal display (LCD). The LCD includes an array of multiple picture elements or pixels that each have separate color component elements. A microlens array is positioned adjacent to the liquid crystal display to direct light from the light source into the picture elements.

Illumination imaging components cooperate with the microlens array to image the radiating element toward the separate color component elements of the liquid crystal display. Multiple differently inclined dichroic mirrors (e.g., blue, red and green in sequence) split the light into light beams of different color components that are imaged onto the appropriate color component elements of the liquid crystal display.

In one embodiment, the illumination imaging components include a hemispherical reflector with the radiating element or arc of the the light source positioned generally at the focal point of the reflector. The hemispherical reflector may be separate from or integrated with the light source. For example, the light source may include a spherical envelope portion that contains the radiating element and a reflective coating that is directly on and partly covers the spherical portion. In another embodiment, a polarizing beam splitter provides high efficiency polarization of light directed to the LCD while also providing optical path length reduction due to a higher refractive index. The systemic utilization of illumination enhancing features cooperate to provide a brighter LCD projector. Increased brightness allows such projectors to be used under a wider variety of lighting and display conditions.

Additional objects and advantages of the present invention will be apparent from the detailed description of the preferred embodiment thereof, which proceeds with reference to the accompanying drawings.

BRIEF DESCRIPTION OF THE DRAWINGS

FIG. 4 is an enlarged illustration of an illumination system in the LCD projector of FIG. 1.

DETAILED DESCRIPTION OF PREFERRED EMBODIMENTS

Figure 1:
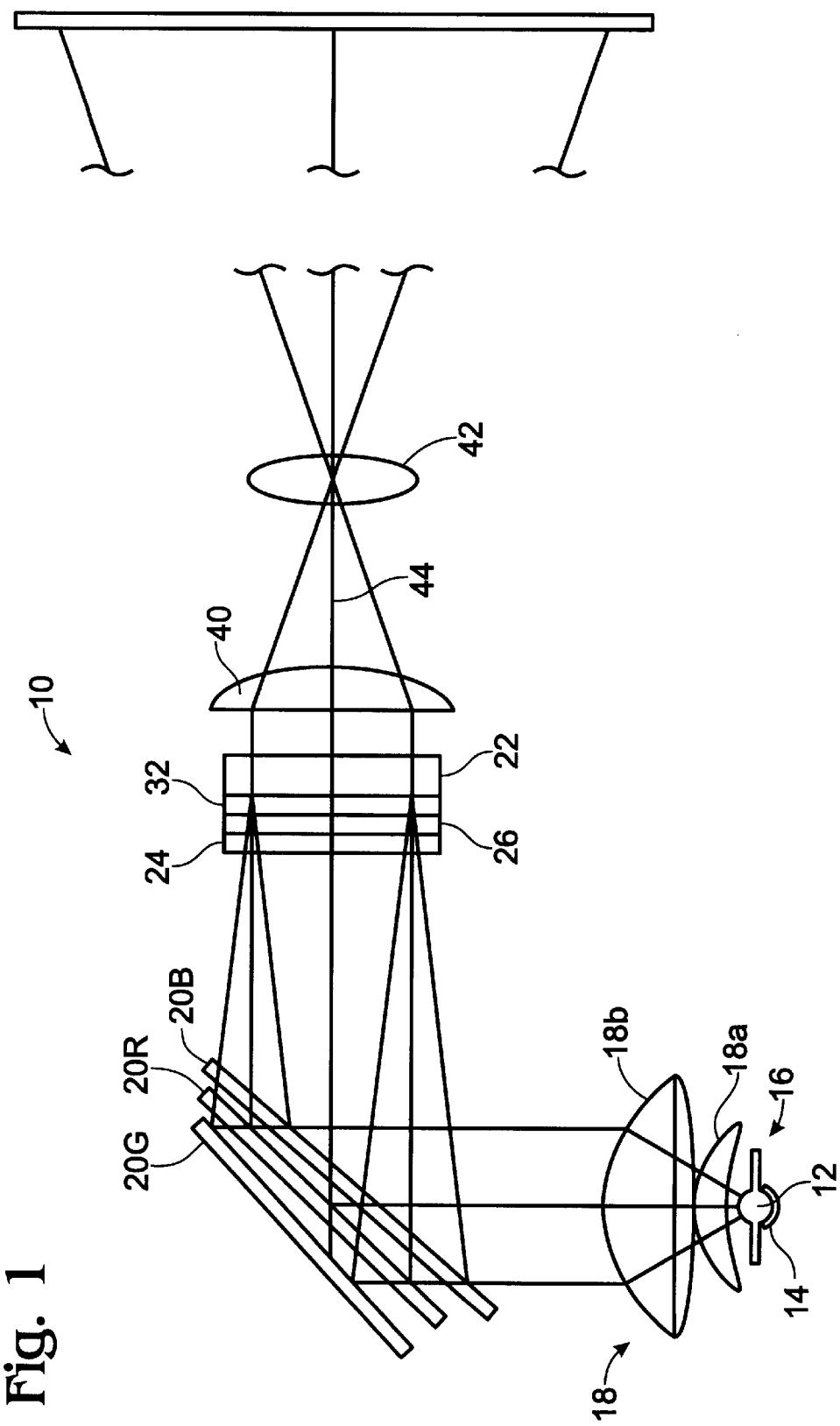
FIG. 1 is a schematic illustration of a color liquid crystal display projector according to the present invention.

FIG. 1 is a schematic illustration of a color liquid crystal projection display system 10 according to the present invention. A white light source 12, such as a metal halide arc lamp, together with a concave (e.g., hemispherical) concentrating reflector 14, forms an illumination system 16 that directs generally white light into a condenser lens assembly 18.

Light source 12 may be an AC or a DC type metal halide arc lamp, or could alternatively be an incandescent halogen lamp or a xenon lamp. Condenser lens assembly 18 generally collimates the white light and directs it toward an array of differently inclined dichroic mirrors 20B, 20R, and 20G that selectively reflect light beams of wavelength ranges corresponding to red, green and blue, respectively, and transmit the light of other wavelength ranges.

Dichroic mirrors 20B, 20R and 20G are of the multi-layer thin-film type, for example. Dichroic mirror 20B reflects visual light having wavelengths shorter than about 400 nm, dichroic mirror 20R reflects visual light having wavelengths greater than about 600 nm, and dichroic mirror 20G reflects visual light having wavelengths in the range of between about 500 nm to 570 nm. Alternatively, a color-independent (e.g., cold) mirror could be substituted for dichroic mirror 20G, as described below in greater detail. The different inclines of dichroic mirrors 20B, 20R and 20G allow them to function together as a high efficiency color separator that directs separate blue, red, green light components toward a liquid crystal display (LCD) 22 (e.g., STN or active matrix display).

The blue, red, and green light components pass successively through a UV/IR reflector 24, and a reflective polarizer 26 (e.g., DBEF II available from 3M Corporation). UV/IR reflector 24 blocks ultraviolet and infrared light from LCD 22. Reflective polarizer 26 polarizes the light by transmitting light components of a selected polarization and reflecting other polarizations. Reflective polarizer 26 may be a thin-film or sheet element carried on a common transparent substrate.

Figure 2:
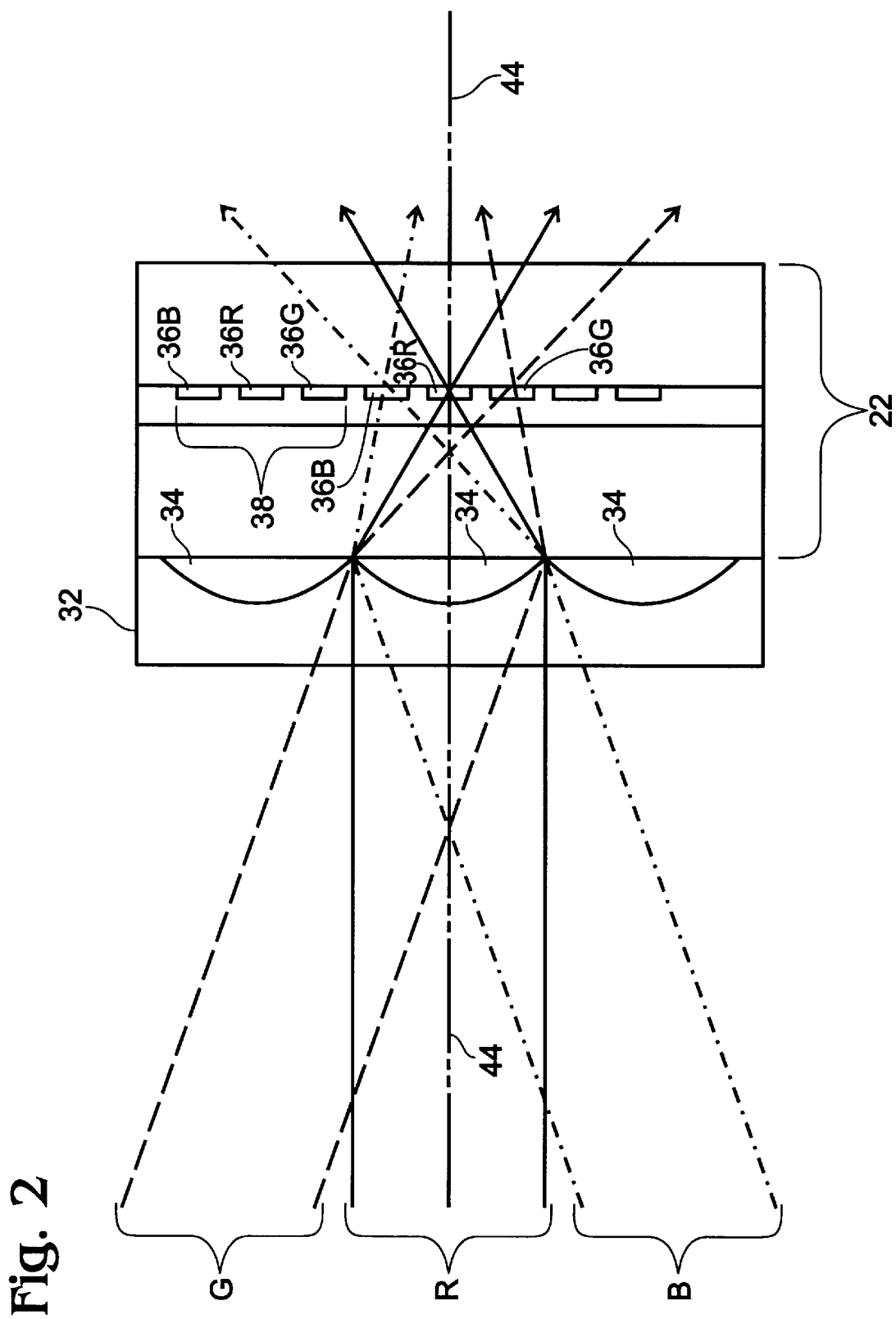
FIG. 2 is an enlarged diagram of a liquid crystal display and an associated microlens array within the projector of FIG. 1 illustrating optical aspects of the present invention.

With additional reference to FIG. 2, a microlens array 32 is positioned immediately before LCD 22 and includes an array of microlens elements or lenslets 34 (e.g., cylindrical or spherical, the latter shown) that are positioned in alignment with the optical apertures 36 of the picture elements or pixels 38 of LCD 22. Microlens array 32 functions to converge the blue, red, and green, light components into respective corresponding apertures 36B, 36R, and 36G, to improve the efficiency of LCD 22. In particular, microlens elements 34 cooperate with the separation of the blue, red, and green, light components by dichroic mirrors 20B, 20R, and 20G to converge the light components into respective corresponding apertures 36B, 36R, and 36G. In the illustration of FIG. 2 the green component light is normally incident upon LCD 22, and the red component light and blue component light are incident at opposed symmetrical angles to the green component light.

Each triplet of apertures 36B, 36R, and 36G corresponds to a pixel and is separately controlled by LCD 22 to form a display image as is known in the art. Microlens array 32 may be a separate element or may be integrally formed into LCD 22, such as in combined LCD/microlens array products available from Sony Corporation. The light that passes through LCD 22 propagates to a field lens 40, either directly or through a collimating microlens array (not shown), that focuses the light toward a conventional objective projection lens assembly 42 such as a varifocal lens assembly. These components are positioned with their centers along an optical axis 44.

U.S. Pat. No. 5,161,042 of Hamada describes an arrangement of dichroic mirrors that are used to form separate color component light beams. The dichroic mirrors of the Hamada patent are arranged in a red-green-blue sequence, in contrast to the blue-red-green sequence shown in FIG. 1. A disadvantage of the red-green-blue color sequence for the dichroic mirrors is that reflections between the red and green mirrors appear as "ghost images," "ringing," or "ripple" that contaminate the blue light color component and result in degraded imaging of the light source.

Figure 3:
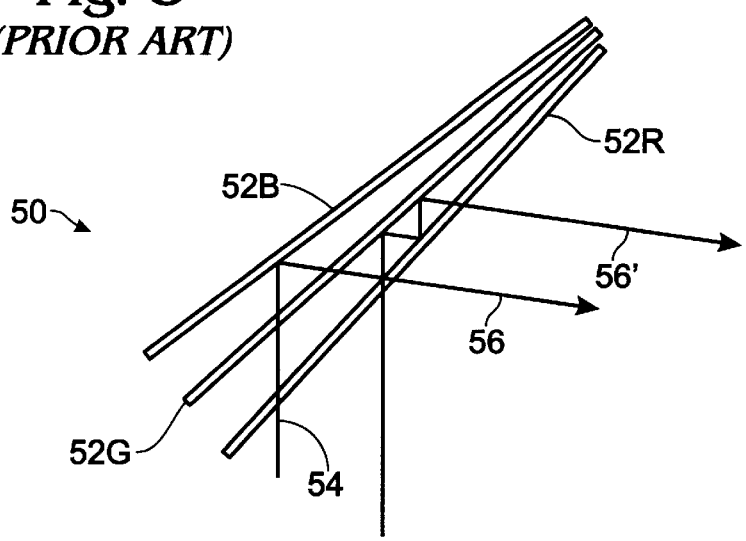
FIG. 3 is an illustration of a prior art array of dichroic mirrors illustrating the manner in which undesirable ghost images are formed.

FIG. 3 is an illustration of a prior art array 50 of dichroic mirrors 52R, 52G, and 52B showing the manner in which ghost images are formed. A blue light input component 54 would ideally pass through dichroic mirrors 52R and 52G and reflect from dichroic mirror 52B and pass back out as a proper blue light output component 56. Due to the color sequence in array 50, however, a portion 58 of blue light output component 56 is reflected between dichroic mirrors 52R and 52G before passing through mirror 52R as a ghost blue light output component 56'. Ghost light output component 56' may be offset from its proper component 56 by a full image element or pixel, thereby resulting in ghosting or crosstalk between pixels (i.e., ghosting).

It is believed that reflection of light portion 58 between dichroic mirrors 52R and 52G correlates with variations or ripple in the transmittance (or reflectance) of color components to be transmitted by the first mirror in the sequence (i.e., dichroic mirror 52R). (The color components, to be transmitted by dichroic mirror 52R are also referred to as its pass band.) The pass band of a red dichroic mirror characteristically has more variation or ripple in transmittance/reflectance than the pass bands of other dichroic mirrors.

To reduce the image ghosting and improve the image quality provided by a color-separating array of dichroic mirrors, therefore, the first dichroic mirror in the sequence should have minimal variation or ripple in the transmittance/reflectance characteristics of its pass bands. (High reflection characteristics in the desired color band is also desirable.) By a similar analysis, the second dichroic mirror in the sequence should have low variation or ripple in the transmittance/reflectance characteristics of its pass bands. In accordance with one aspect of this invention, therefore, the first dichroic mirror in the sequence is selected to be of a color other than red (i.e., blue in one embodiment). A benefit of having the blue dichroic mirror as the first in the sequence is that it removes the blue color component from the light reaching the red dichroic mirror, thereby preventing the particular blue color image ghosting characteristic of the prior art configuration.

Further in accordance with an embodiment of this invention, the color purity of the green color component is relatively less critical than the color purity of the red and blue color components. Green light makes up about 80 percent of the light energy perceptible by human beings. Incidental red or blue color contamination is unlikely to noticeably affect the perceived color purity of green light. In contrast, incidental green contamination of red or blue color components can cause readily perceived degradations in color purity. Additional green filtering of light remaining after blue and red color components are removed is not necessary to maintain the perceived purity of the green component. As a result, the blue-red-green sequence shown in FIG. 1 may be implemented with a green dichroic mirror for the green color component or, alternatively, a color insensitive (e.g., cold) mirror that reduces cost and increases illumination efficiency.

FIG. 4 is an enlarged illustration of illumination system 16 of LCD projection display 10. Light source 12, which is shown as a metal halide arc lamp, includes an outer envelope 50 formed of quartz and a pair of electrodes 52a and 52b positioned within envelope 50 and apart from each other to form an arc gap 54 within which an illuminating arc or element 56 (shown in outline) is formed. Quartz envelope 50 includes tubular segments 58 positioned opposite a generally spherical main body portion 62.

Reflector 14 is formed as an integral reflector coating positioned on a back surface of spherical body portion 62 of quartz envelope 50. In one implementation, the coating of reflector 14 is generally hemispherical. Reflector coating 14 functions to reflect light directed toward the rear surface of quartz envelope 50 by arc 56 back through arc gap 54 and out the uncoated portion of envelope 50. Reflector coating 14 eliminates or reduces light losses that would arise from Fresnel reflections of the light from arc 56 as the light passes through the rear surface of envelope 50 toward a reflector that is spaced apart from the surface of envelope 50. Fresnel reflections occur whenever light passes through a transparent surface and in this instance could result in a marked loss of light available for illumination of LCD 22. Reflector coating 14 may be of a type provided as a Heat Buster™ coating available from Deposition Sciences, Inc. of Santa Rosa, Calif.

Figure 5:
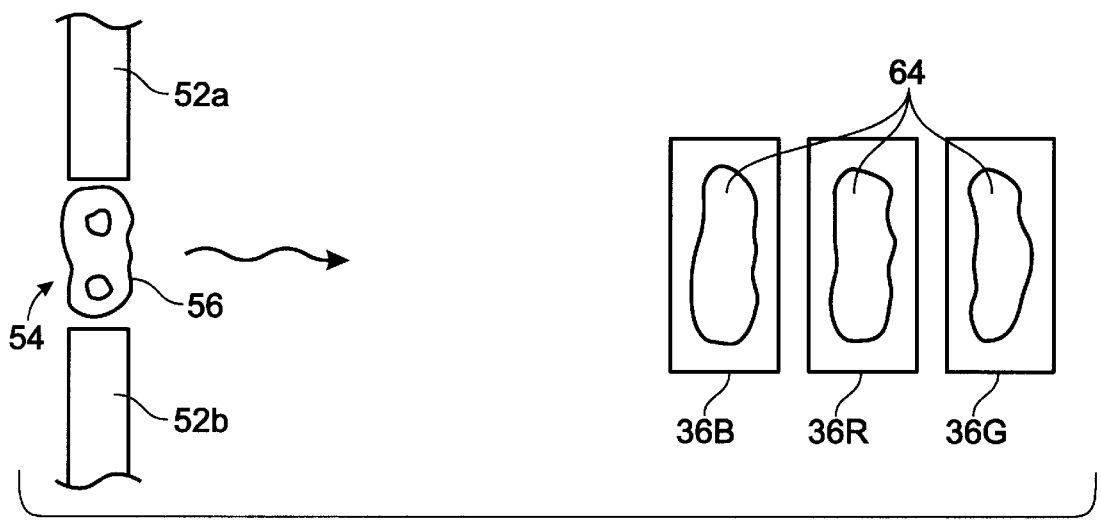
FIG. 5 illustrates imaging of an arc of a light source onto pixel apertures.

FIG. 5 illustrates the imaging of arc 56 onto pixel apertures 36 by condenser lens assembly 18. As illustrated, the image 64 of arc 56 has an aspect ratio that generally conforms to the aspect ratio and orientation of apertures 36. More specifically, optical apertures 36B, 36R, and 36G typically are oriented in the vertical direction and have elongate aspect ratios in that direction. Light source 12 is selected to have arc gap 54 that forms an arc 56 having a conforming aspect ratio. Imaging arc 56 onto apertures 36 provides increased illumination efficiency over prior projection systems.

Light reflected by reflector 14 from light source 12 is highly efficiently collected and directed along optical axis 44. First condenser lens 18a is positioned with its input surface 70 close to light source 12 (e.g., within 0–1 mm) so that the light condenser lens 18a receives directly from arc 56 is within a relatively small input angle. First condenser lens 18a may be formed from fused silica quartz to withstand the high surface temperatures (e.g., about 1100° C.) of an arc light source 12.

Alternatively, with spacings between input surface 70 and light source 12 of 2–3 mm, condenser lens 18a could be formed of widely available glasses referred to as B-270 or Duran from Schott or Pyrex® from Corning. The combination of reflector coating 66 on quartz envelope 50, the configuration of reflector 14, and the close proximity of input surface 70 of condenser lens 18a allows illuminating arc 56 to be imaged onto pixel apertures 36 with minimal light loss. In addition, the uncoated surface of the spherical main body portion 62 of envelope 50 may have a diffuser or diffusive surface formed thereon. A diffuser would function toto increase the angular dispersion of the light.

Figure 6:
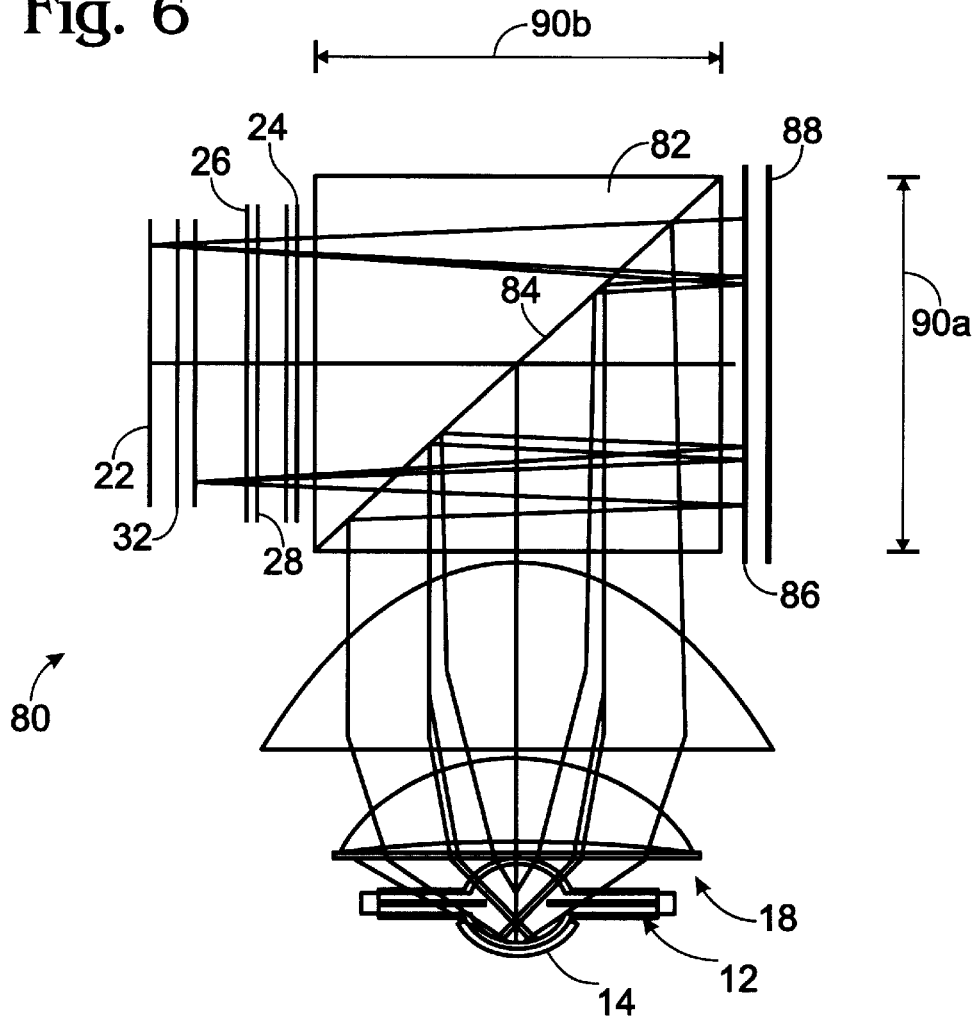
FIG. 6 is a side schematic illustration of an alternative embodiment of a color liquid crystal display projector according to the present invention.

FIG. 6 is a side schematic illustration of an alternative embodiment of a color liquid crystal projection display system 80 according to the present invention. Display system 80 is substantially the same as display system 10 with common elements having the same reference numerals. Display system 80 includes, however, a polarizing beam splitter 82 that losslessly polarizes the light from light source 12 while reducing the possibility of heat damage to a conventional absorptive film polarizer (e.g., used in place of reflective polarizer 26).

As is known, polarizing beam splitter 82 polarizes incident unpolarized light by reflecting S- and P-polarized light from a first inclined surface 84 toward a quarter wave film retarder 86. Quarter wave film retarder 86 reflects one of the polarizations of light (e.g., S-polarized light) and transmits the other polarization of light (e.g., P-polarized light).

Figure 7:
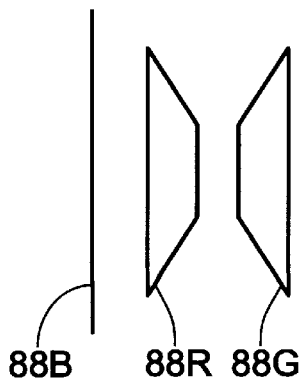
FIGS. 7 and 8 are enlarged side and top illustrations of a set of inclined dichroic mirrors as oriented in the illustration of FIG. 6.
Figure 8:
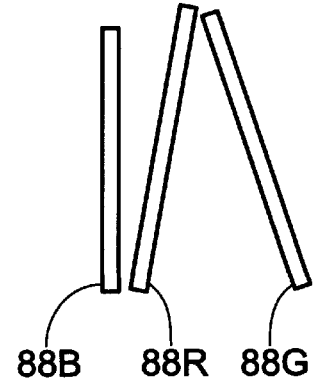

The S-polarized light propagates back through inclined surface 84, while the P-polarized light passes through a set of inclined dichroic mirrors 88B, 88R, and 88G (shown enlarged in side and top views in FIGS. 7 and 8) to be color separated and reflected back through quarter wave retarder 86. Reflection of the P-polarized light by dichroic mirrors 88 changes the light polarization to S-polarization, and the light passes through inclined surface 84 toward LCD 22.

Another advantage polarizing beam splitter 82 is that it can be formed with any of a variety of glasses including glass type SF5, which has a refractive index of 1.68. With path length dimensions 90a and 90b of 36 mm each, the average path length of light through polarizing beam splitter is 72 mm, which is equivalent to an air path length of 121 mm. Such a reduction in optical path length is desirable in LCD projection displays because shorter path lengths allow the manufacture of smaller, more portable projectors. It will be appreciated that condenser lens assembly 18 in projection system 10 would be modified to accommodate the shortened path length, hence projection system 80 is shown as having a condenser lens assembly 18'.

Another advantage of the arrangement of projector 80 is that the arrangement allows light source 12 to be operated with a horizontal orientation as shown in FIG. 4. This orientation aligns the radiating arc of the light source with the orientation of the apertures in LCD 22. In addition, the horizontal orientation of an arc light source 12 allows it to maintain uniform illumination characteristics over a longer period. Furthermore, this arrangement provides a beneficial orientation and position of LCD 22 in the context of providing an up-right forward-facing display projector. Such a form factor minimizes the need for fold optics to re-direct the optical axis into the preferred direction.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. In a color liquid crystal display projector having a light source with a radiating element within an arcuate envelope and a liquid crystal display with plural picture elements each of which has separate color component elements, a microlens array being positioned adjacent to the liquid crystal display to direct light from the light source into the plural picture elements, the improvement comprising:

illumination imaging components that cooperate with the microlens array to image the radiating element toward the separate color component elements of the liquid crystal display, the illumination imaging components including a lens assembly with an optical surface positioned within about 3 mm of the arcuate envelope of the light source; and a plurality of dichroic mirrors for splitting the light into a plurality of light beams of different color components, the dichroic mirrors cooperating with the illumination imaging components to image the different color components onto the color component elements of the liquid crystal display.

2. The projector of claim 1 in which the illumination imaging components include a reflector and in which the light source is positioned at a focal point of the reflector.

3. The projector of claim 1 in which the arcuate envelope of the light source includes a reflective coating that is directly on the arcuate envelope.

4. The projector of claim 3 in which the reflective coating is generally hemispherical.

5. The projector of claim 1 in which the light source is an arc lamp.

6. The projector of claim 1 in which the lens assembly is positioned within about 1 mm of the arcuate envelope of the light source and is formed of silica quartz.

7. The projector of claim 1 in which the plurality of dichroic mirrors include blue and red color component dichroic mirrors positioned such that the blue color component dichroic mirror receives light before the red color component dichroic mirror.

8. The projector of claim 1 in which the plurality of dichroic mirrors include blue and red color component dichroic mirrors positioned such that the blue color component dichroic mirror receives light reflected from the red color component dichroic mirror.

9. The projector of claim 1 further including a color insensitive mirror positioned with the dichroic mirrors to reflect one of the color components of light.

10. The projector of claim 9 in which the plurality of dichroic mirrors include blue and red color component dichroic mirrors.

11. The projector of claim 1 in which the light source is an arc lamp.

12. The projector of claim 1 in which the optical surface of the condenser lens assembly is positioned within about 1 mm of the envelope of the light source and is formed of silica quartz.

13. In a color liquid crystal display projector having a light source with a radiating element within an arcuate envelope and a liquid crystal display with plural picture elements each of which has separate color component elements, a microlens array being positioned adjacent to the liquid crystal display to direct light from the light source into the plural picture elements, the improvement comprising:

illumination imaging components that cooperate with the microlens array to image the radiating element toward the separate color component elements of the liquid crystal display, the illumination imaging components including a reflective coating that is directly on and partly covers the arcuate envelope, the illumination imaging components including a condenser lens assembly with an optical surface positioned within about 3 mm of the arcuate envelope of the light source; and a plurality of dichroic mirrors for splitting the light into a plurality of light beams of different color components, the dichroic mirrors cooperating with the illumination imaging components to image the different color components onto the appropriate color component elements of the liquid crystal display.

14. The projector of claim 13 in which the arcuate envelope includes a generally spherical envelope portion and the reflective coating is generally hemispherical on the spherical envelope portion.

15. The projector of claim 13 in which the plurality of dichroic mirrors include blue and red color component dichroic mirrors positioned such that the blue color component dichroic mirror receives light before the red color component dichroic mirror.

16. The projector of claim 13 in which the plurality of dichroic mirrors include blue and red color component dichroic mirrors positioned such that the blue color component dichroic mirror receives light reflected from the red color component dichroic mirror.

17. The projector of claim 13 further including a color insensitive mirror positioned with the dichroic mirrors to reflect one of the color components of light.

18. The projector of claim 17 in which the plurality of dichroic mirrors include blue and red color component dichroic mirrors.

19. The projector of claim 13 further including a polarizing beam splitter for polarizing light from the light source.

20. In a color liquid crystal display projector having a light source with a radiating element and a liquid crystal display with plural picture elements each of which has separate color component elements, a microlens array being positioned adjacent to the liquid crystal display to direct light from the light source into the plural picture elements, the improvement comprising:

illumination imaging components that cooperate with the microlens array to image the radiating element toward the separate color component elements of the liquid crystal display; and a plurality of dichroic mirrors for splitting the light into a plurality of light beams of different color components, the plurality of dichroic mirrors including blue and red color component dichroic mirrors positioned such that the blue color component dichroic mirror receives light before the red color component dichroic mirror, the dichroic mirrors cooperating with the illumination imaging components to image the different color components onto the color component elements of the liquid crystal display.

21. In a color liquid crystal display projector having a light source with a radiating element within an arcuate envelope and a liquid crystal display with plural picture elements each of which has separate color component elements, a microlens array being positioned adjacent to the liquid crystal display to direct light from the light source into the plural picture elements, the improvement comprising:

illumination imaging components that cooperate with the microlens array to image the radiating element toward the separate color component elements of the liquid crystal display, the illumination imaging components including a reflective coating that is directly on and partly covers the arcuate envelope; and a plurality of dichroic mirrors for splitting the light into a plurality of light beams of different color components, the plurality of dichroic mirrors including blue and red color component dichroic mirrors positioned such that the blue color component dichroic mirror receives light before the red color component dichroic mirror, the dichroic mirrors cooperating with the illumination imaging components to image the different color components onto the appropriate color component elements of the liquid crystal display.

* * * * *